T. H. McCULLOCH.
Grain Drying Device.

No. 27,917.  Patented April 17, 1860.

Witnesses:
J. W. Coomly
R. S. Spencer

Inventor:
T. H. McCulloch
per Munn & Co
Attorneys.

UNITED STATES PATENT OFFICE.

T. H. McCULLOCH, OF PEORIA, ILLINOIS.

GRAIN-DRYING MACHINE.

Specification of Letters Patent No. 27,917, dated April 17, 1860.

*To all whom it may concern:*

Be it known that I, T. H. McCULLOCH, of Peoria, in the county of Peoria and State of Illinois, have invented a new and Improved Grain Drying and Evaporating Apparatus; and I do hereby declare that the following is a full, clear, and exact description of the same, reference being had to the annexed drawings, making a part of this specification, in which—

Figure 1:
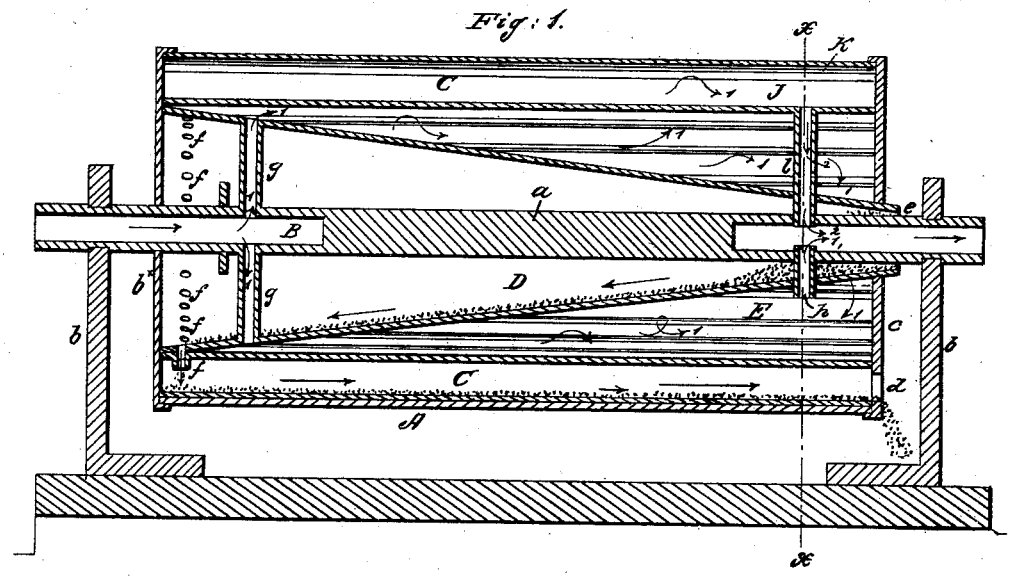
Figure 2:
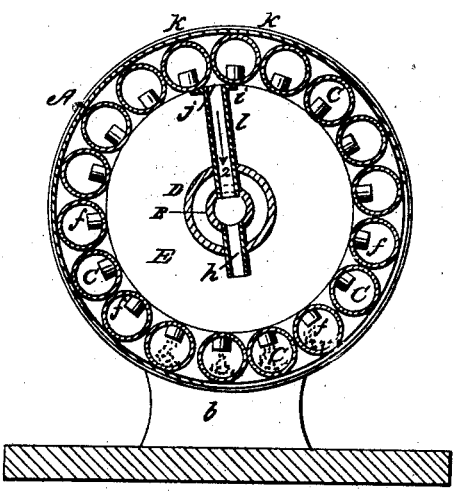

Figure 1, is a longitudinal central section of my invention. Fig. 2, a transverse vertical section of ditto.

Similar letters of reference indicate corresponding parts in the two figures.

This invention consists in the employment or use of a series of tubes and a conical chamber placed within a rotating inclined shell, and arranged substantially as hereinafter shown, whereby the article or substance to be dried or acted upon by heat, is within a limited space, and consequently by a very compact device, subjected to a great heating surface, and the desired work efficiently and expeditiously performed.

To enable those skilled in the art to fully understand and construct my invention I will proceed to describe it.

A represents a hollow, cylinder, or shell, provided with a hollow shaft or axis B, having a partition or plug $a$, at its center to prevent a direct communication through it, see Fig. 1. The shaft B, is fitted in bearings at the upper ends of uprights $b$, $b$, one of which is a trifle higher than the other, to give the shaft and cylinder a slightly inclined position as shown in Fig. 1.

Within the cylinder A, and all around its inner surface there are attached tubes C, said tubes extending the whole length of the cylinder, and closed at one end by the head $b^x$, but are open at the opposite ends the head $c$, being perforated as shown at $d$, Fig. 1. Within the cylinder A, there is also placed a conical chamber D. This chamber extends the whole length of the cylinder, and its larger end is closed by the cylinder head $b^x$, but the smaller end projects through the head $c$, a space $e$, being allowed between the shaft B, and the end of the chamber. The chamber D, is concentric with shaft B. The interior of the chamber D, communicates at its larger end with the tubes C, by means of small tubes $f$, which project a certain distance within the tubes C, as shown in Fig. 1.

Between the tubes C, and the chamber D, there is a space or chamber E, which communicates with the shaft B, near one end by tubes $g$, the space E, communicating near its opposite end with the shaft B, by a tube $h$, the plug or partition $a$, being between the tubes $g$, $h$.

The operation is as follows: The cylinder A, is rotated by any convenient power and steam or hot air passes into the shaft B, and through the tubes $g$, $g$, into the space E, and from space E, through tube $h$, out through the opposite end of shaft B, as indicated by the black arrows 1. The grain or other substance to be dried or acted upon by the heat, is passed into the smaller end of the chamber D, and in consequence of the conical form of said chamber passes toward its larger end and through the tubes $f$, into the tubes C, the grain or other substance in consequence of the slightly inclined position of the cylinder A, passes toward the openings $d$, of the tubes C, through which it is discharged, perfectly dried or freed from moisture, in consequence of passing over the heated surfaces of the chamber D, and tubes C, the small tubes $f$, extend a certain distance into the tubes C, to prevent the grain or substance passing back into the chamber D, by the rotation of the cylinder, the rotation causing the grain or other substance to pass through all the tubes C, and causing a large quantity of the same to be dried very expeditiously and in a thorough manner.

In case steam is employed to heat the chamber D, and tubes C, it would be requisite to have some means to carry off the water of condensation, and to this end I connect two of the tubes C, by a plate $i$, which forms a lifting chamber $j$, spaces $k$, being allowed between the outer part of one of said tubes C, and the inner side of the cylinder A, to allow the water of condensation to pass into said chamber as it passes underneath the shaft B, the chamber $j$, has a tube $l$, communicating with it, and the discharge end of the shaft B, to allow the water of condensation to pass out as the chamber $j$, passes over shaft B, see arrows 2 Figs. 1 and 2.

This device will answer extremely well for evaporating the moisture from sugar and other substances, and in fact may be generally applied in all cases for drying and evaporating the moisture from substances which can be passed through it.

Having thus described my invention what

I claim as new and desire to secure by Letters Patent, is—

1. The tubes C, conical chamber D, and hollow plugged shaft B, placed within a rotating slightly inclined cylinder or shell A, and arranged to form steam or hot air passages $g$, E, $h$ to heat the chamber D, and tubes C, substantially as and for the purpose set forth.

2. I further claim the arrangement of the plate $i$, connecting two tubes C, to form a water-lifting chamber $j$, and the tube $l$, to form a communication between said chamber $j$, and the shaft B, as and for the purpose specified.

T. H. McCULLOCH.

Witnesses:
 DAVID McCULLOCH,
 JOHN B. LAWRENCE.